US012646761B2

(12) United States Patent
Aoki et al.

(10) Patent No.: US 12,646,761 B2
(45) Date of Patent: Jun. 2, 2026

(54) BATTERY PACK

(71) Applicant: DENSO CORPORATION, Kariya-city (JP)

(72) Inventors: Kousuke Aoki, Kariya-city (JP); Tatsuhiro Numata, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 472 days.

(21) Appl. No.: 17/135,199

(22) Filed: Dec. 28, 2020

(65) Prior Publication Data

US 2021/0210803 A1    Jul. 8, 2021

(30) Foreign Application Priority Data

Jan. 6, 2020    (JP) ................................. 2020-000361

(51) Int. Cl.
*H01M 10/48*        (2006.01)
*H01M 10/42*        (2006.01)
(Continued)

(52) U.S. Cl.
CPC ....... *H01M 10/482* (2013.01); *H01M 10/425* (2013.01); *H01M 10/4257* (2013.01);
(Continued)

(58) Field of Classification Search
CPC ............. H01M 10/425; H01M 10/482; H01M 10/4257; H01M 50/204;
(Continued)

(56) References Cited

U.S. PATENT DOCUMENTS 5,617,102 A * 4/1997 Prater .................. H01Q 3/2605
342/434
6,201,514 B1    3/2001 Iwasawa et al.
(Continued)

FOREIGN PATENT DOCUMENTS

JP        WO2015189898 A1 * 4/2017 ................ H02J 7/02
JP             2018017552 A * 2/2018 ............. G01S 13/04

OTHER PUBLICATIONS

Beaumont, Olivier, Arnaud Legrand, and Yves Robert. "The master-slave paradigm with heterogeneous processors." IEEE Transactions on Parallel and Distributed Systems 14.9 (2003): 897-908 (Year: 2003).*

(Continued)

*Primary Examiner* — Tiffany Legette
*Assistant Examiner* — Jared Hansen
(74) *Attorney, Agent, or Firm* — Oliff PLC

(57)        ABSTRACT
A battery pack includes a housing, a plurality of assembled batteries disposed in the housing, obtaining units arranged one for each of the assembled batteries in the housing, and the monitoring device equipped with a master antenna. The obtaining units obtain battery information about the assembled batteries and transmit it to the master antenna of the monitoring device through wireless communication using slave antennas. The master antenna and/or the slave antennas are each implemented by a directional antenna which emits a radio wave to be higher in power in a given directional direction than in a given undirectional direction. This minimizes a risk of a communication failure arising from radio wave interference.

18 Claims, 9 Drawing Sheets

(51) Int. Cl.

| | |
|---|---|
| *H01M 50/204* | (2021.01) |
| *H01Q 1/22* | (2006.01) |
| *H01Q 1/24* | (2006.01) |
| *H01Q 19/10* | (2006.01) |
| *H01Q 21/00* | (2006.01) |

(52) U.S. Cl.
    CPC ............ *H01M 50/204* (2021.01); *H01Q 1/22*
        (2013.01); *H01Q 1/24* (2013.01); *H01Q 19/10*
        (2013.01); *H01Q 21/00* (2013.01); *H01M*
                                 *2010/4278* (2013.01)

(58) Field of Classification Search
    CPC ... H01M 2010/4278; H01Q 1/22; H01Q 1/24;
                H01Q 19/10; H01Q 21/00; Y02E 60/10
    See application file for complete search history.

(56) References Cited

U.S. PATENT DOCUMENTS

| | | | |
|---|---|---|---|
| 7,164,932 | B1 | 1/2007 | Sato et al. |
| 2004/0110469 | A1* | 6/2004 | Judd ....................... H01Q 1/007 |
| | | | 455/562.1 |
| 2007/0001923 | A1* | 1/2007 | Slattman ................ H01Q 1/246 |
| | | | 343/872 |
| 2011/0156640 | A1* | 6/2011 | Moshfeghi .............. H02J 50/12 |
| | | | 320/108 |
| 2013/0149578 | A1 | 6/2013 | Uchida |
| 2016/0056510 | A1* | 2/2016 | Takeuchi ............ H01M 10/482 |
| | | | 429/50 |
| 2019/0237816 | A1* | 8/2019 | Kim .................... H01M 10/425 |
| 2019/0271762 | A1* | 9/2019 | Sakai ...................... G01S 13/93 |
| 2020/0006815 | A1* | 1/2020 | Hwang ................... H01Q 1/22 |

OTHER PUBLICATIONS

Hurley, C., et al. "Chapter 2—Understanding Antennas and Antenna Theory." WarDriving and Wireless Penetration Testing; Syngress: Rockland, MA, USA (2007): 31-61 (Year: 2007).*

LeMieux, Mattison. Investigating a horizontal helical antenna for use in the phantom monopole configuration. Marquette University, 2012 (hereafter referred to as LeMieux-2012) (Year: 2012).*

Alonso, Damian, et al. "Towards a wireless battery management system: evaluation of antennas and radio channel measurements inside a battery emulator." 2014 IEEE 80th Vehicular Technology Conference (VTC2014-Fall). IEEE, 2014 (Year: 2014).*

Alonso, Damián, Oliver Opalko, and Klaus Dostert. "Channel measurements and simulations with planar inverted F-antennas in an enhanced testbed for a wireless battery management system." WSA 2015; 19th International ITG Workshop on Smart Antennas. VDE, 2015 (Year: 2015).*

Alonso, Damián, Oliver Opalko, and Klaus Dostert. "Physical layer performance analysis of a wireless data transmission approach for automotive lithium-ion batteries." 2015 IEEE Vehicular Networking Conference (VNC). IEEE, 2015 (Year: 2015).*

Alonso, Damian, Oliver Opalko, and Klaus Dostert. "Parametrization of automotive lithium-ion batteries and its influence on the wireless in-battery channel." 2016 10th European Conference on Antennas and Propagation (EuCAP). IEEE, 2016 (Year: 2016).*

Bansal, Pallavi, and P. R. Nagaraj. "Wireless battery management system for electric vehicles." 2019 IEEE Transportation Electrification Conference (ITEC-India). IEEE, 2019 (Year: 2019).*

Farahani, Shahin. "Chapter 5-RF propagation, antennas, and regulatory requirements." ZigBee Wireless Networks and Transceivers (2008): 171-206 (Year: 2008).*

R.D. Thrower, "Radio Mirrors for Communications," Electronics World for May 1969, pp. 27-39 (Year: 1969).*

JPWO2015189898a1, Terada, "Battery System", machine English translation retrieved from https://worldwide.espacenet.com/ Date: Jan. 14, 2026 (Year: 2017).*

* cited by examiner

BATTERY PACK

CROSS REFERENCE TO RELATED DOCUMENT

The present application claims the benefit of priority of Japanese Patent Application No. 2020-000361 filed on Jan. 6, 2020, the disclosure of which is incorporated herein by reference.

BACKGROUND

1 Technical Field

This disclosure relates generally to a battery pack equipped with a plurality of assembled batteries.

2 Background Art

Battery packs are known which are equipped with a metallic housing, a plurality of assembled batteries, a plurality of obtaining units, and a monitoring device which are installed in the housing. The obtaining units are arranged one for each of the assembled batteries. Each of the obtaining units works to obtain battery information from a corresponding one of the assembled batteries. The monitoring device obtains the battery information through wireless communications with the obtaining units.

The monitoring device and the obtaining units are each equipped with a wireless communication antenna. Radio waves emitted from the antennas usually reflect on an inner surface of the metallic housing, thereby generating a number of reflected waves. This may cause a plurality of radio waves to be superimposed on each other on a receive antenna of the monitoring device. Such addition leads to radio wave interference causing a communication failure, which may result in error in wireless communication with the monitoring device or communication failure The magnitude of the communication failure arising from the radio wave interference usually depends upon a radio communication frequency. Therefore, when a communication error or communication failure occurs at some communication frequency, it requires that the communication frequency is changed to achieve radio communications. For instance, Japanese Patent No. 6228552 teaches the above technologies.

The change in communication frequency will result in success in ratio communications, but however, does not serve to minimize the risk of the communication failure or communication failure. It is, therefore, required to change the communication frequency each time the communication failure or communication back out occurs. Frequent occurrence of the communication failure results in a decrease in number of times data is updated. The above communication system is, therefore, unsuitable for systems needing real-time control of, for example, battery packs.

SUMMARY

It is an object of this disclosure to provide a battery pack designed to minimize a risk of communication failure arising from a radio wave interference.

According to one aspect of this disclosure, there is provided a battery pack which comprises: (a) a housing; (b) a plurality of assembled batteries disposed in the housing; (c) obtaining units each of which obtains given battery information about a corresponding one of the assembled batteries, the obtaining units being equipped with slave antennas; and (d) a monitoring device which is equipped with a master antenna which achieves a wireless communication with the slave antenna of each of the obtaining units to receive the battery information within the housing.

The master antenna and/or the slave antennas are implemented by a directional antenna which radiates a radio wave more strongly in power in a given directional direction than in a given undirectional direction.

The battery pack is, as described above, equipped with the directional antenna used as the master antenna and/or the slave antennas and, thus, works to emit the radio wave strongly in power in the directional direction in which the radio wave is intended to be irradiated and reduce irradiation of the radio wave in the undirectional direction in which the radio wave is not intended to be irradiated, thereby minimizing a risk of diffuse reflection in the battery pack. This also avoids undesirable input of unintended reflected waves to the receiving antenna and decreases a risk of a communication failure arising from radio wave interference.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

3

Figure 17:
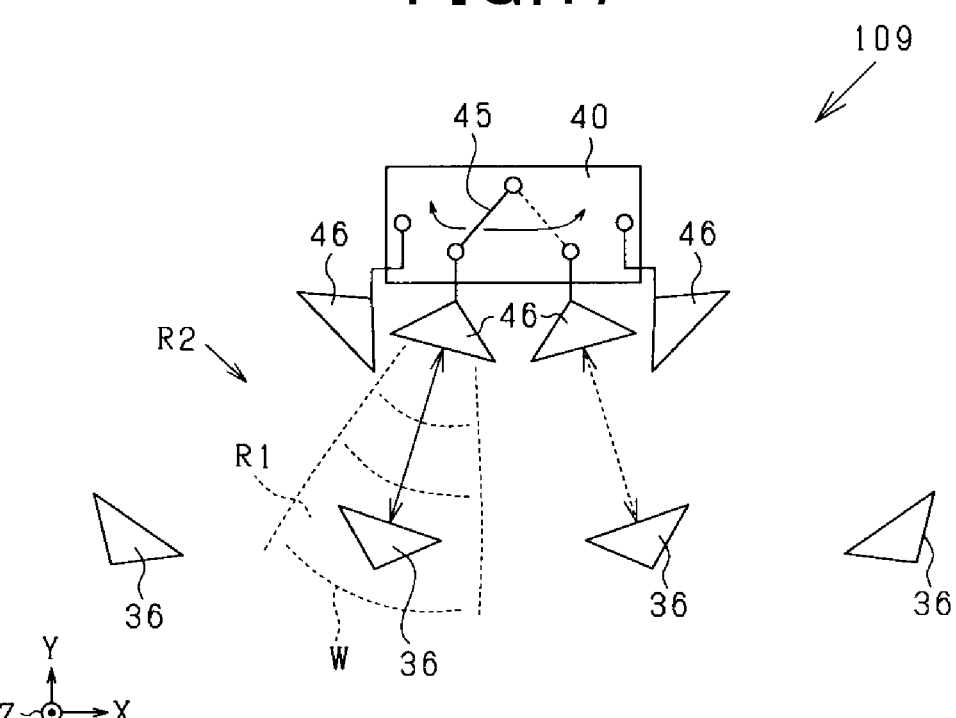
Figure 18:
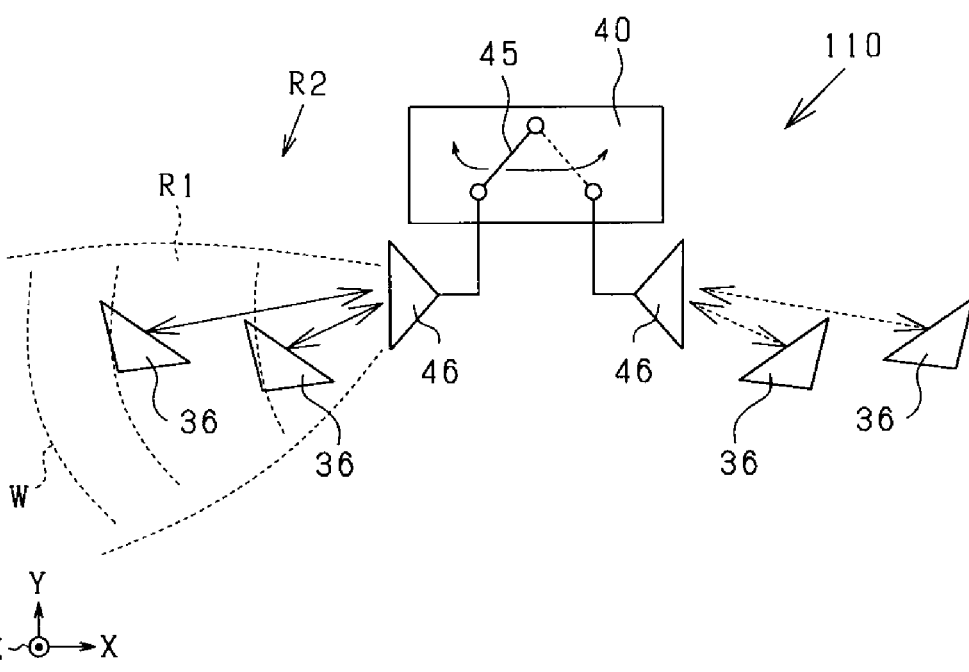

FIG. 17 is a plan sectional view which illustrates a battery pack according to the ninth embodiment; and FIG. 18 is a plan sectional view which illustrates a battery pack according to the tenth embodiment.

DESCRIPTION OF THE PREFERRED EMBODIMENTS

Embodiments will be described below with reference to the drawings. It should be appreciated that the invention can be embodied in various ways without departing from the principle of the invention.

First Embodiment

Figure 1:
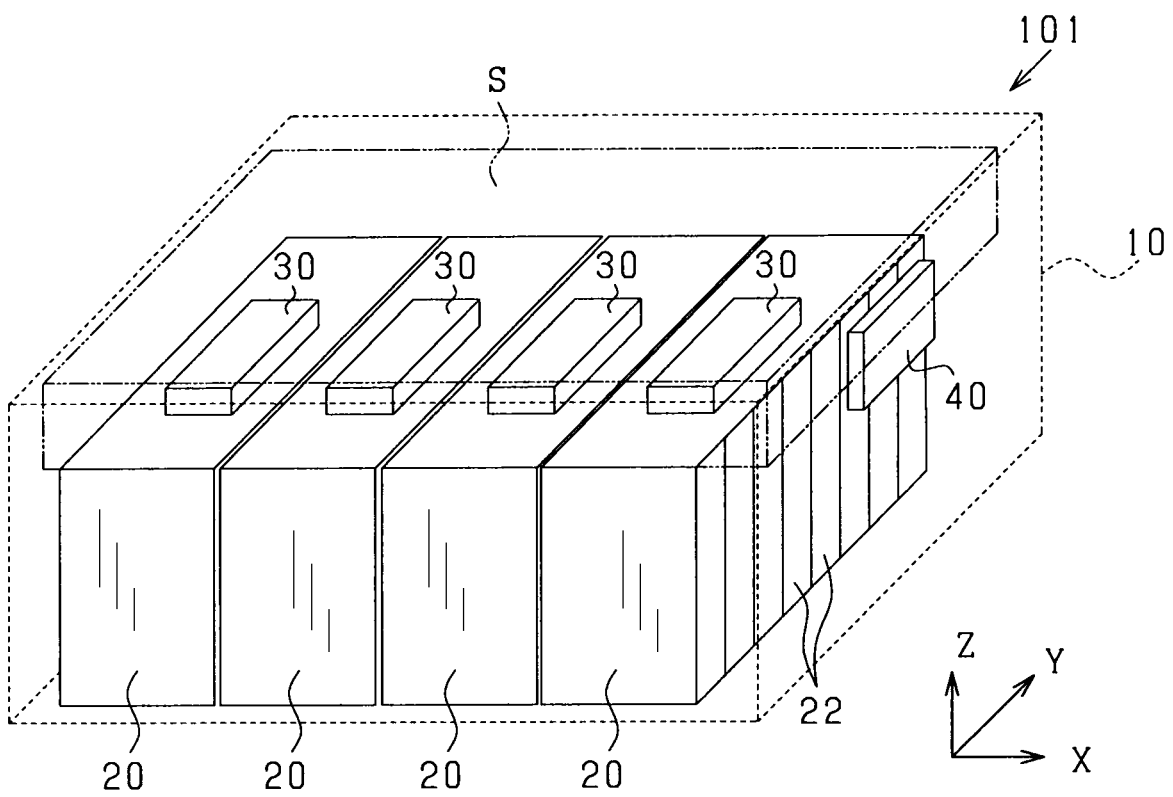
FIG. 1 is a perspective view which illustrates a battery pack according to the first embodiment.

FIG. 1 is a perspective view which illustrates the battery pack 101 according to the first embodiment. The battery pack 101 is mounted in a vehicle, such as an automobile. The battery pack 101 includes the housing 10 made of an electrically conductive material, such as metal, a plurality of assembled batteries 20, a plurality of obtaining units 30, and the monitoring device 40. The assembled batteries 20, the obtaining units 30, and the monitoring device 40 are disposed in the housing 10. The obtaining units 30 and the monitoring device 40 work as a battery monitoring system to monitor operations or states of the assembled batteries 20.

In the following discussion, three directions perpendicular to each other will be referred to as a lateral direction X, a longitudinal direction Y, and a vertical direction Z only for the brevity of explanation. The layout of the battery pack 101 may, however, be optionally changed to have the direction Z oriented in a lateral direction or the direction X oriented in a longitudinal direction. The directions X, Y, and Z will also be referred to as first, second, and third direction, respectively.

The assembled batteries 20 are arranged adjacent each other in the lateral direction X. Each of the assembled batteries 20 has a plurality of electrical cells 22 arranged adjacent each other in the longitudinal direction Y. The electrical cells 22 are connected electrically in series.

The obtaining units 30 is provided one for each of the assembled batteries 20. Specifically, each of the obtaining units 30 is mounted on an upper surface of a corresponding one of the assembled batteries 20. Each of the obtaining units 30 obtains battery information about a corresponding one of the assembled batteries 20 therefrom. The battery information may be data about a voltage developed at and/or a temperature of the electrical cells 22 of the assembled battery 20 and/or an electrical current flowing through the assembled battery 20.

The monitoring device 40 is disposed inside the housing 10 and attached to a right inner surface of the housing 10. The monitoring device 40 is capable of achieving wired or wireless communications with a main electronic control unit (ECU) not shown.

The housing 10 is of a box shape three-dimensionally surrounding the master antenna 46 and slave antennas 36. "three-dimensionally surrounding", as referred to in this discussion, means that an object is enclosed from a total of six directions: opposite directions (i.e., positive and negative directions) in a first direction, opposite directions (i.e. positive and negative directions) in a second direction, and opposite directions (i.e., positive and negative directions) in a third direction. The first, second, and third directions are directions oriented perpendicular to each other. Specifically, in this embodiment, the housing 10 exists in the six directions, as viewed from each of the antennas 46 and 36. The housing 10 may be designed to have openings, such as screw holes, vent holes, or connector holes.

The upper surfaces of the assembled batteries 20 and an upper inner surface of the housing 10 define therebetween a communication region S which is three-dimensionally enclosed by electrically conductive members. In other words, the communication region S is defined in an interval between the outer surfaces of the assembled batteries 20 and the inner surface (i.e., the ceiling surface) of the housing 10 and has a dimension (i.e., a thickness) in a direction in which the interval extends. Specifically, the communication region S is three-dimensionally enclosed by the upper surfaces of the obtaining units 30 and five inner surfaces of an upper portion of the housing 10. The inner surfaces of the upper portion of the housing 10 include a ceiling surface of the housing 10 and four inner side surfaces: a right inner surface, a left inner surface, a front inner surface, and a rear inner surface of the upper portion of the housing 10. The communication region S is shaped to have a smallest one of three dimensions thereof as a thickness in the vertical direction Z. The thickness-wise direction of the communication region S is, therefore, oriented in the vertical direction Z. The longitudinal direction of the communication region S is oriented in a direction perpendicular to the vertical direction Z (i.e., the horizontal direction X or Y. In the following discussion, directions perpendicular to the thickness-wise direction of the communication region S will also be referred to as a first region direction and a second region direction.

Figure 2:
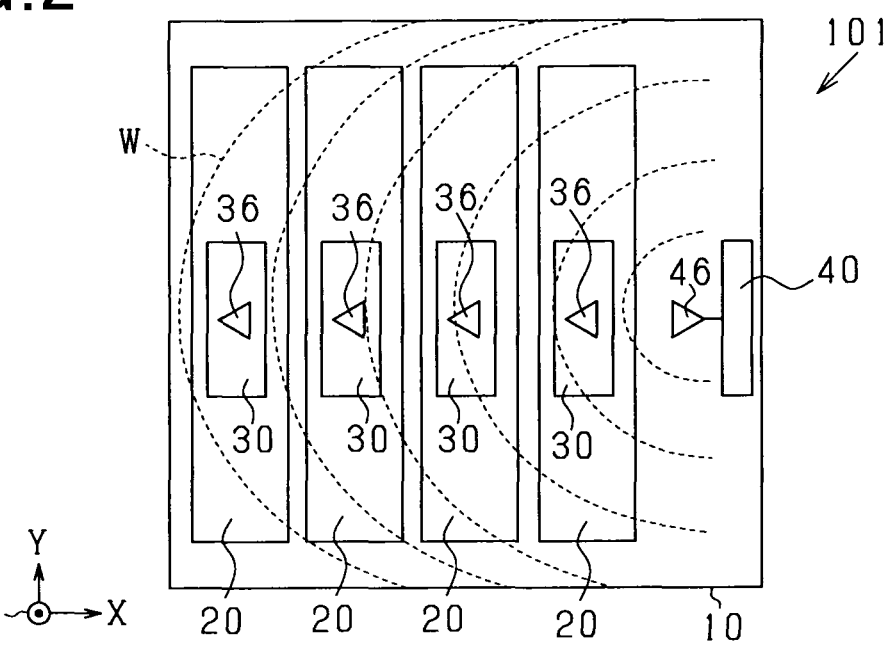
FIG. 2 is a plan sectional view which illustrates a battery pack according to the first embodiment.
Figure 3:
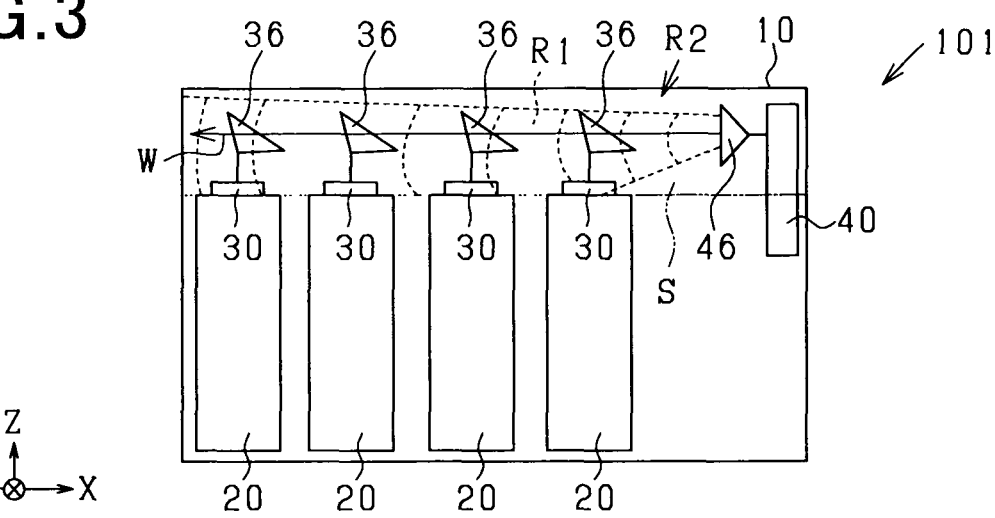
FIG. 3 is a front sectional view which illustrates a battery pack according to the first embodiment.

FIG. 2 is a plan sectional view which illustrates the battery pack 101. FIG. 3 is a front sectional view which illustrates the battery pack 101. Each of the obtaining units 30 is equipped with the slave antenna 36 which achieves wireless communication (also called a radio communication) with the monitoring device 40. Each of the slave antennas 36 protrudes upward from the upper surface of a corresponding one of the obtaining units 30. In other words, the slave antennas 36 are all disposed inside the communication region S.

The monitoring device 40 is equipped with the master antenna 46 which achieves wireless communication with each of the slave antennas 36. The monitoring device 40 works to wirelessly output an information request to request for each of the obtaining units 30 to output the battery information or an equalization request for each of the obtaining units 30 to equalize levels of voltage developed at the electrical cells 22.

In the following discussion, radio waves which are not subjected to reflection at all after being emitted from the antennas 46 or 36 will also be referred to as a direct wave, while radio waves which are subjected to reflection at least one time after being emitted from the antennas 46 or 36 will also be referred to as a reflected wave. The master antenna 46 is located on the right side of the rightmost one of the assembled batteries 20 and above the upper surface of the rightmost assembled battery 20. In other words, the master antenna 46 is, like the slave antennas 36, arranged inside the communication region S. The above layout of the master antenna 46 enables the mater antenna 46 to emit a radio wave in the form of the direct wave thereof to each of the slave antennas 36. Similarly, each of the slave antennas 36 is capable of transmitting a radio wave in the form of the direct wave thereof to the master antenna 46.

A dimension of the communication region S in the vertical direction Z, in other words, an interval between the upper surfaces of the assembled batteries 20 and the ceiling surface (i.e., the inner upper surface) of the housing 10 in the vertical direction Z is as small as 3 cm, 2 cm, or 1 cm or less. This minimizes a risk that the radio wave W may undergo diffuse reflection in the vertical direction Z within the communication region S. The master antenna 46 and the slave antennas 36 are, therefore, each implemented by a directional antenna which is capable of emitting the radio wave W with higher intensity in the horizontal directions X and Y that in the vertical direction Z.

Specifically, each of the antennas 46 and 36 is engineered to have an undirectional direction oriented in the vertical direction Z in which the radio wave W is not intended to be emitted and have a directional direction (which will also be referred to as a directivity directions) oriented in a horizontal direction over a range between the directions X and Y in which the radio wave W is intended to be emitted. Specifically, the master antenna 46, as illustrated in FIG. 2, two-dimensionally emits the radio wave W horizontally over a range between the horizontal directions, i.e., directional directions X and Y. The master antenna 46, as can be seen in FIG. 3, does not emit the radio wave W in the vertical direction Z that is the undirectional direction. In other words, the master antenna 46 is designed not to emit the radio wave W three-dimensionally omnidirectionally.

Each of the slave antennas 36 is, like the master antenna 46, emits the radio wave W, not shown, two-dimensionally over a range between the horizontal directions or directional directions X and Y and does not emit the radio wave W in the vertical direction W that is the undirectional direction. In other words, each of the slave antennas 36 is designed not to output the radio wave W three-dimensionally omnidirectionally.

In the following discussion, a region in which the strength or power (also called a level) of a radio wave outputted from each of the antennas 46 and 36 (i.e., directional antennas) becomes reduced by 3 dB (decibel) or more from an initial power thereof will be referred to as an undirectional region. Conversely a region in which the strength or power of a radio wave outputted from each of the antennas 46 and 36 is not lowered by 3 dB or more from an initial power thereof will be referred to as a directional region. The master antenna 46 is designed to have a directivity in which the directional region, as denoted by R1, of the direct wave thereof is located away from at least one of limits (i.e., upper and lower boundaries) of the communication region S in the vertical direction Z.

Specifically, in this embodiment, the master antenna 46 has the directivity in which the directional region R1 of the direct wave produced thereby does not reach the upper end of the communication region S, in other words, the ceiling surface of the housing 10. The undirectional region R2 is, therefore, created above the directional region R1 within the communication region S. Each of the slave antennas 36 is arranged inside the directional region R1 of the master antenna 46. Each of the slave antennas 36, like the master antenna 36, is designed to have directivity in which the directional region of the direct wave, as produced thereby, is kept away from the upper end of the communication region S, in other words, the ceiling surface of the housing 10. The master antenna 46 is located in the directional regions of the slave antennas 36.

Figure 4:
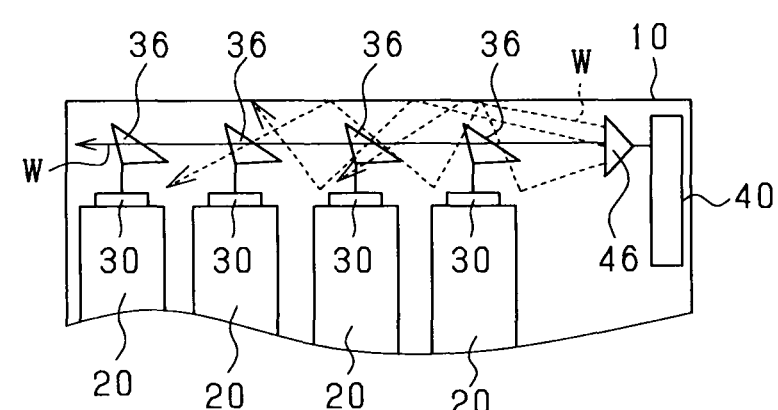
FIG. 4 is a front sectional view which illustrates a comparative example of a battery pack.

The battery pack 101 in this embodiment offers the following beneficial advantages. FIG. 4 demonstrates a comparative example in which each of the master antenna 46 and the slave antennas 36 is implemented by a typical antenna having nodirectivity. The antennas 46 and 36 are, as described above, arranged in the communication region S having a small dimension in the vertical direction Z. In a case where each of the antennas 46 and 36 is made of a typical antenna illustrated in FIG. 4, the radio wave W emitted from each of the slave antennas 46 to the master antenna 36 or vice versa will undergo diffuse reflections a number of time between the upper and lower end of the communication region S, that is, between the ceiling surface of the housing 10 and the upper surface of each of the assembled batteries 20, thereby causing the reflected waves to be incident on the antennas 46 and 36, which may lead to a risk of communication failure arising from the radio wave interference.

In contrast to the example of FIG. 4, each of the slave antennas 36 and the master antenna 46 in this embodiment is made of a directional antenna and, as illustrated in FIG. 3, emits the radio wave W more strongly in the horizontal direction than in the vertical direction Z within the communication region S. This minimizes a risk that the radio wave W may be strongly directed to the end of the communication region S in the vertical direction Z, thereby reducing the diffuse reflection of the radio wave W in the communication region S. This avoids unwanted incidence of the reflected waves to the slave antennas 36, thereby minimizing a risk of the communication failure arising from the radio wave interference.

Specifically, the radio wave W outputted from each of the antennas 46 and 36, has a directivity creating a radiation range in which the radio wave W is allowed to be radiated in the vertical direction Z and which is narrower than that in which the radio wave W is allowed to be radiated in any horizontal directions X and Y in the communication region S. This minimizes a risk of diffuse reflection of radio waves in the vertical direction Z.

The master antenna 46 is also designed to have a directivity in which the directional region R1 of the direct wave created thereby is kept away from at least one of the upper and lower ends of the communication region S in the vertical direction Z. This minimizes the diffuse reflection in the vertical direction Z as compared with when the directional region R1 is defined to reach both the upper and lower ends of the communication region S in the vertical direction Z.

Each of the slave antennas 36 is located within the directional region R1 of the master antenna 46, thereby enabling each of the slave antennas 36 to receive a strong power of the radio wave W from the master antenna 46. Similarly, the master antenna 46 is located within the directional region of each of the slave antennas 36, thereby enabling the master antenna 46 to receive a high power of a radio wave from each of the slave antennas 36.

The slave antennas 36 are aligned with each other in the lateral direction X. The lateral direction X is a direction which traverses the undirectional direction Z of the master antenna 46, but is not oriented in the undirectional direction Z. The master antenna 46 is, therefore, capable of effectively radiating the radio wave W to each of the slave antennas 36.

Second Embodiment

The second embodiment will be described below. In the following discussion, the same reference numbers as those in the first embodiment will refer to the same or similar parts, and explanation thereof in detail will be omitted here. The battery packs referred to in the embodiments will, however, be assigned with different reference numbers. The second embodiment will be referred to in terms of parts different from those in the first embodiment.

Figure 5:
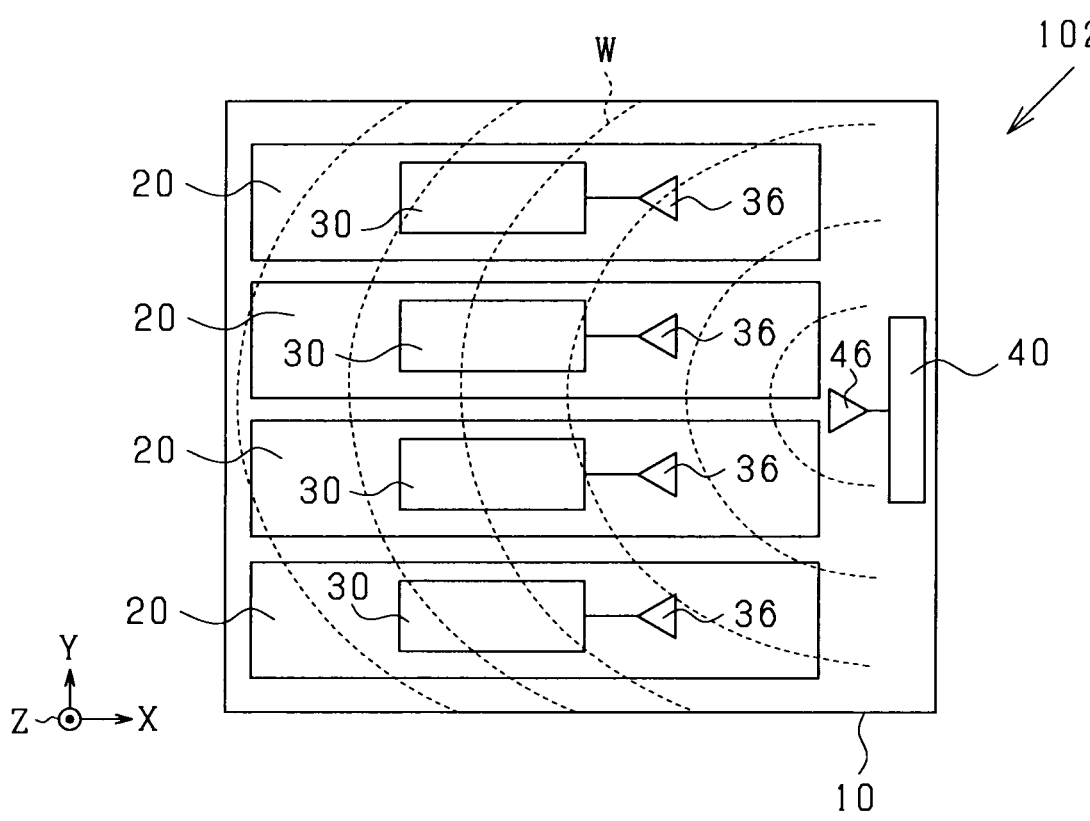
FIG. 5 is a plan sectional view which illustrates a battery pack according to the second embodiment.
Figure 6:
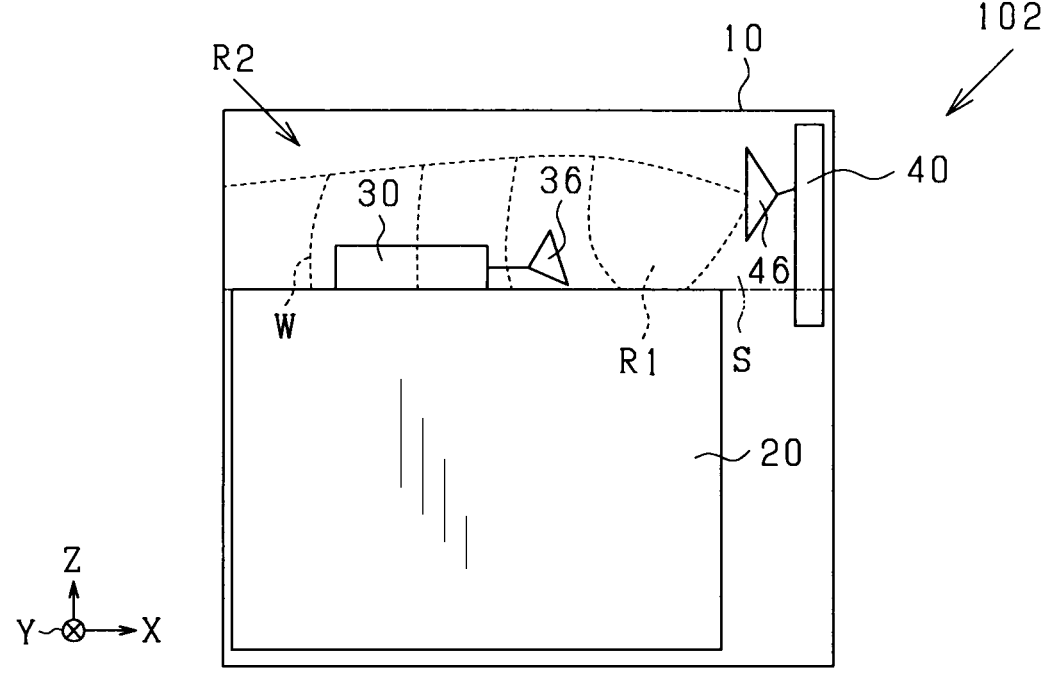
FIG. 6 is a front sectional view which illustrates a battery pack in the second embodiment.

FIG. 5 is a plan view which illustrates the battery pack 102 in the second embodiment. FIG. 6 is a front sectional view of the battery pack 102. The assembled batteries 20 in this embodiment are, as can be seen in FIG. 5, arranged at an orientation of 90° to those in the first embodiment around an axis extending in the vertical direction Z. Specifically, the assembled batteries 20 are arranged adjacent each other in the longitudinal direction Y, not the lateral direction X. In other words, the assembled batteries 20 have lengths extending substantially parallel to each other in the lateral direction X. Similarly, the obtaining units 30 are arranged adjacent each other in the longitudinal direction Y. The slave antennas 36 are arranged adjacent each other in the longitudinal direction Y. Each of the slave antennas 36 extends outside a corresponding one of the obtaining units 30 in the rightward direction. The layout of the master antenna 46, the directional directions X or Y of the antennas 46 and 36, and the undirectional direction Z are the same as those in the first embodiment.

In this embodiment, the slave antennas 36 are, as described above, arranged adjacent each other in the longitudinal direction Y, not the lateral direction X. The longitudinal direction Y is a direction traversing or intersecting with the undirectional direction Z of the master antenna 46, in other words, out of alignment with the undirectional direction Z, thereby enabling the master antenna 46 to emit the radio waves W effectively to the slave antennas 36.

Third Embodiment

The third embodiment will be described below in terms of parts different from those in the first embodiment.

Figure 7:
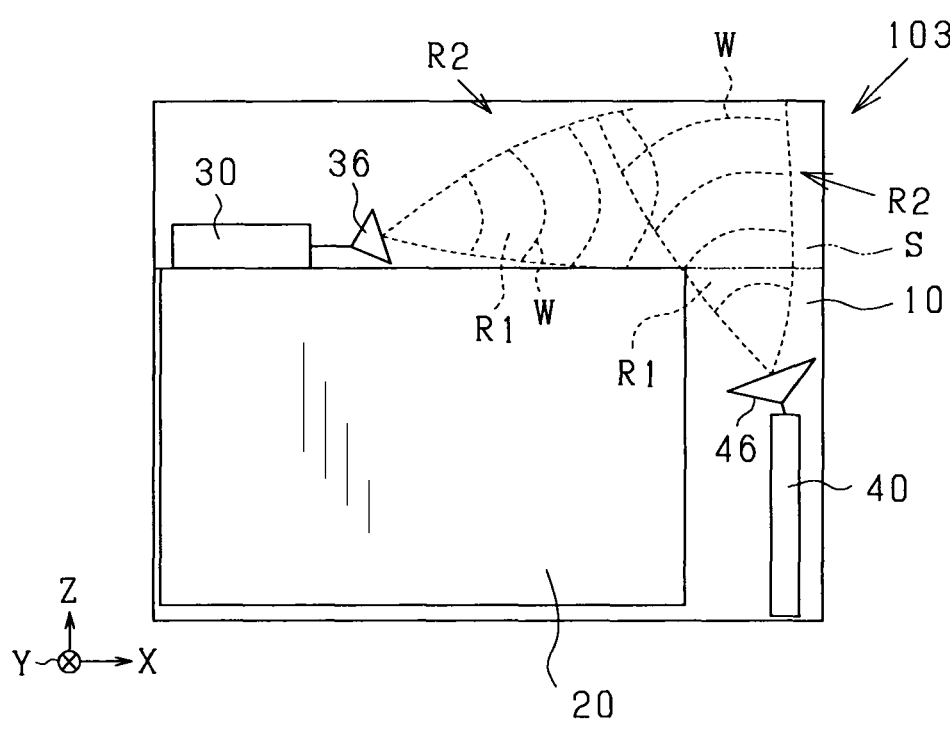
FIG. 7 is a front sectional view which illustrates a battery pack according to the third embodiment.

FIG. 7 is a plan sectional view which illustrates the battery pack 103 in the third embodiment which is a modification of the second embodiment. Specifically, the monitoring device 40 is located at a level lower than that in the second embodiment. The master antenna 46 is, therefore, located on the right side of the assembled batteries 20 and at a level lower than the upper surfaces of the assembled batteries 20 in the vertical direction Z. In other words, the master antenna 46 is arranged outside, that is, below the communication region S. This causes the direct wave, as emitted by the master antenna 46, not to reach the slave antennas 36. Similarly, the direct wave emitted by each of the slave antennas 36 does not reach the master antenna 46.

Figure 8:
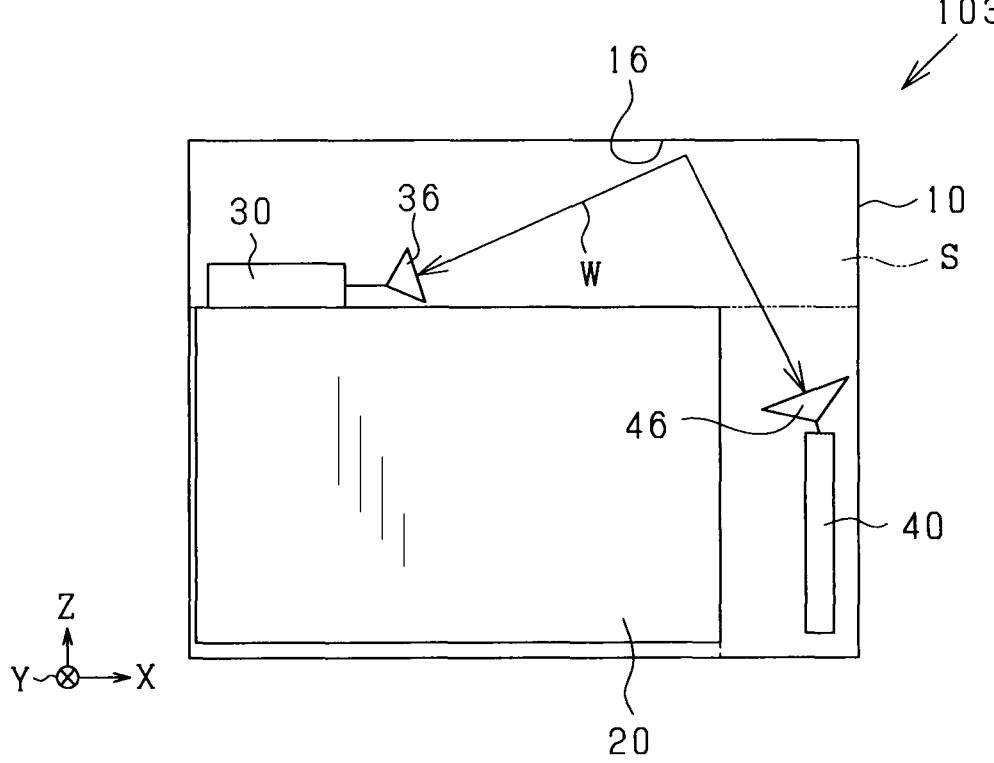
FIG. 8 is a front sectional view which demonstrates radiation of a radio wave within the battery pack in FIG. 7.

In order to avoid the above drawback, the housing 10, as illustrated in FIG. 8, has disposed therein the reflector 16 which reflects the radio wave W within the housing 10. The master antenna 46 has a directivity to the reflector 16 and emits the radio wave W to the reflector 16. The reflector 16 reflects the radio wave W which is then received by each of the slave antennas 36. Each of the slave antennas 36 has a directivity to the reflector 16 and emits the radio wave W to the reflector 16. The radio wave W is then reflected on the reflector and received by the master antenna 46.

Specifically, the housing 10 made of an electrically conductive material has the ceiling surface (i.e., the inner upper surface) whose portion serves as the reflector 16. The radio wave W, as outputted from the master antenna 46, is reflected one time on the reflector 16 and reaches each of the slave antennas 36. Similarly, the radio wave W, as radiated by each of the slave antennas 36, is reflected one time on the reflector 16 and reaches the master antenna 46.

In the communication region S, the radio waves W outputted by the antennas 46 and 36, that is, a one-time reflected wave resulting from reflection of the radio wave W emitted by the master antenna 46 on the reflector 16 and the direct waves radiated directly from the slave antennas 36 are stronger in power in the horizontal direction X or Y than in the vertical direction Z.

The use of the reflector 16 enables radio communications to be achieved between the master antenna 46 and the slave antennas 36 if an obstacle, such as an electrically conductive object, exists therebetween. This enhances the degree of freedom of layout of the antennas 46 and 36 in the housing 10, which also improves the degree of freedom of layout of the monitoring device 40 and the obtaining units 30.

Fourth Embodiment

The fourth embodiment will be described below in terms of parts different from those in the third embodiment.

Figure 9:
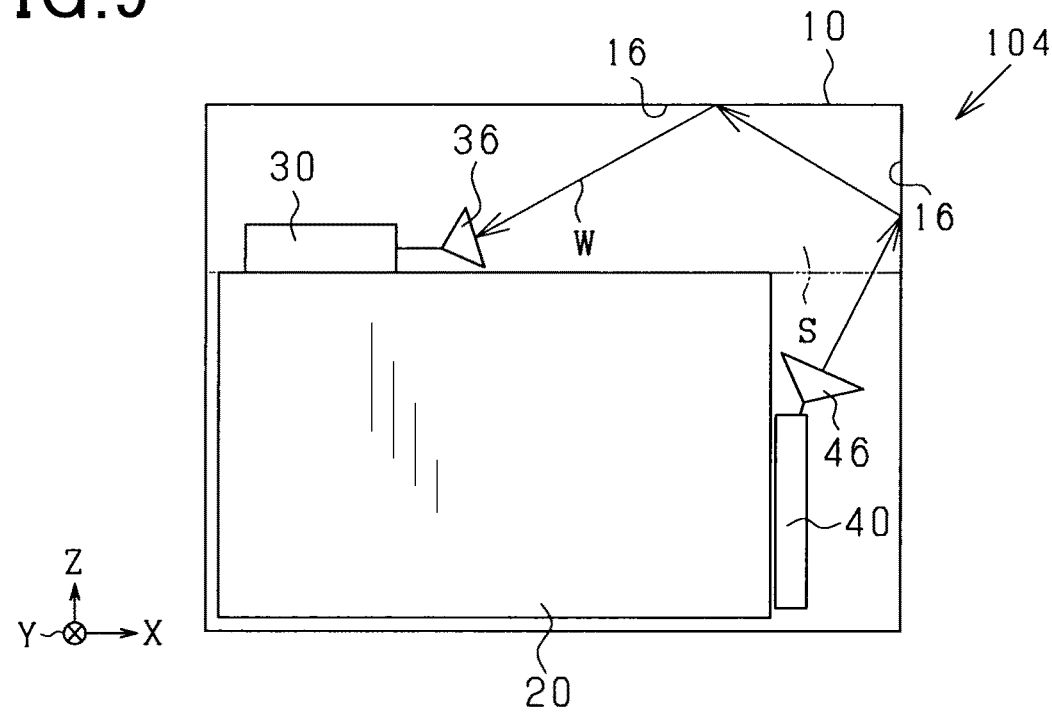
FIG. 9 is a front sectional view which illustrates a battery pack according to the fourth embodiment.

FIG. 9 is a front view which illustrates the battery pack 104 in the fourth embodiment. The master antenna 46 is located on the right side of the assembled batteries 20 and closer to the left side of the housing 10 than that in the third embodiment. In other words, the master antenna 46 is arranged closer to the assembled batteries 20 than in the third embodiment. This will result in a failure in transmitting the one-time reflected wave, as emitted by the master antenna 46, to each of the slave antennas 36. Similarly, it is impossible for each of the slave antennas 36 to deliver the one-time reflected wave to the master antenna 46. In order to eliminate such a problem, the right side wall of the housing 10 is designed to have a portion serving as the second reflector 16 in addition to the reflector 16 (which will also be referred to as the first reflector 16) on the ceiling surface of the housing 10.

In operation, the master antenna 46 is oriented to have a directivity toward the second reflector 16 of the housing 10 and emits the radio wave W. The radio wave W is reflected both on the second reflector 16 on the side wall of the housing 10 and on the first reflector 16 on the ceiling of the housing 10 and then reaches to each of the slave antennas 36. In other words, a twice-reflected wave arising from two-time reflections of the radio wave W outputted by the master antenna 46 arrive at each of the slave antennas 36. Each of the slave antennas 36 has a directivity toward the first reflector 16 on the ceiling of the housing 10 and emits the radio wave W to the first reflector 16. The radio wave W is then reflected both on the first reflector 16 on the ceiling surface of the housing 10 and on the second reflector 16 on the inner side surface of the housing 10 and reaches the master antenna 46. In other words, a twice-reflected wave arising from two-time reflections of the radio wave W emitted by each of the slave antennas 36 reaches the master antenna 46.

The battery pack 104 in this embodiment is capable of achieving success in radio communications between the master antenna 46 and each of the slave antennas 36 even if it is difficult to transmit a one-time reflected wave between the master antenna 46 and each of the slave antennas 36. This enhances the degree of freedom of layout of the antennas 46 and 36 in the housing 10, which also improves the degree of freedom of layout of the monitoring device 40 and the obtaining units 30.

Fifth Embodiment

The fifth embodiment will be described below in terms of parts different from those in the second embodiment.

Figure 10:
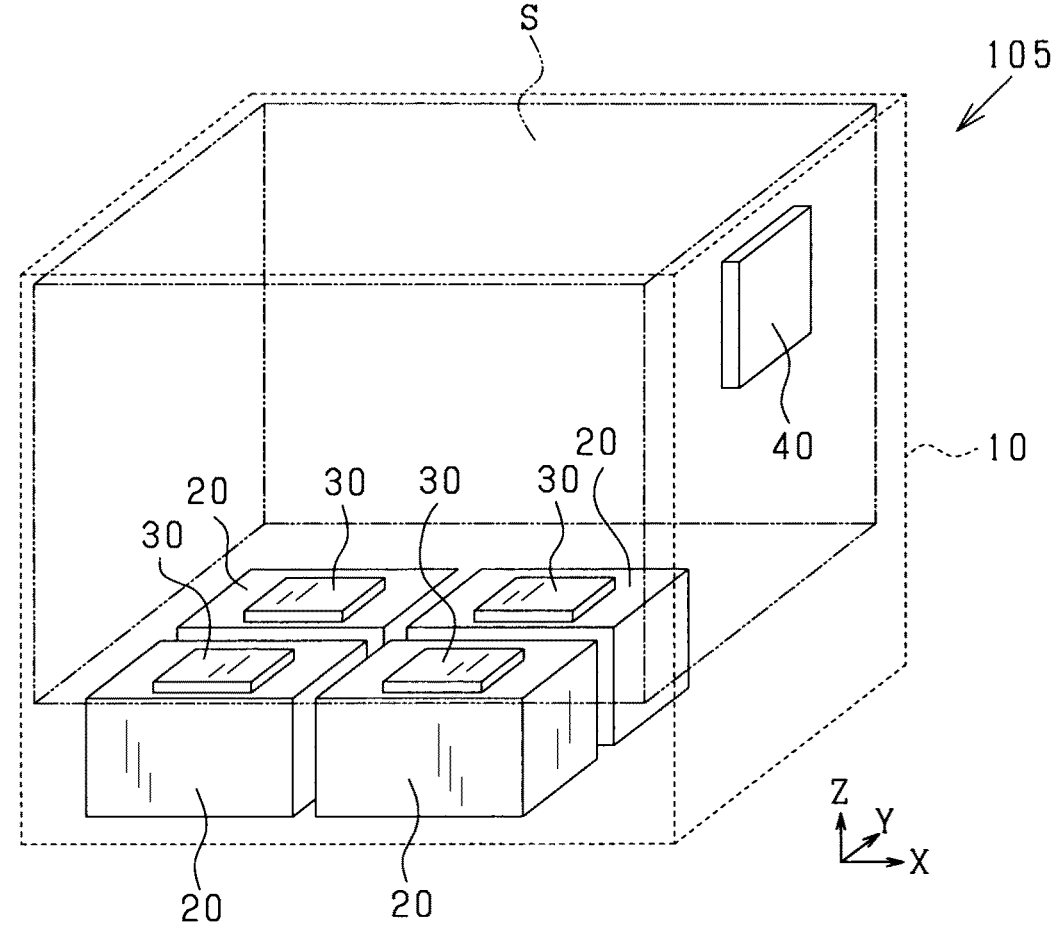
FIG. 10 is a perspective view which illustrates a battery pack according to the fifth embodiment.

FIG. 10 is a perspective view which illustrates the battery pack 105 in the fifth embodiment. The battery pack 105 has a plurality of arrays of assembled batteries 20. The assembled batteries 20 are, unlike in the second embodiment, not arranged adjacent each other in line in the longitudinal direction Y. Specifically, the battery pack 105 has two arrays of the assembled batteries 20. The size of each of the housing 10 and the communication region S is, therefore, smaller than in the second embodiment in the longitudinal direction Y. Conversely, the size of each of the housing 10 and the communication region S is greater than in the second embodiment in the vertical direction Z. The communication region S, thus, has the smallest dimension in the longitudinal direction Y, not the vertical direction Z. Accordingly, a thickness-wise direction of the communication region S is the direction Y (which is referred to as a longitudinal direction in the above embodiments). The lengthwise direction of the communication region S is a direction X or Z perpendicular to the longitudinal direction Y. In the following discussion, the directions X and Z perpendicular to the longitudinal direction Y will also be merely referred to as front-back perpendicular directions X and Z.

Figure 11:
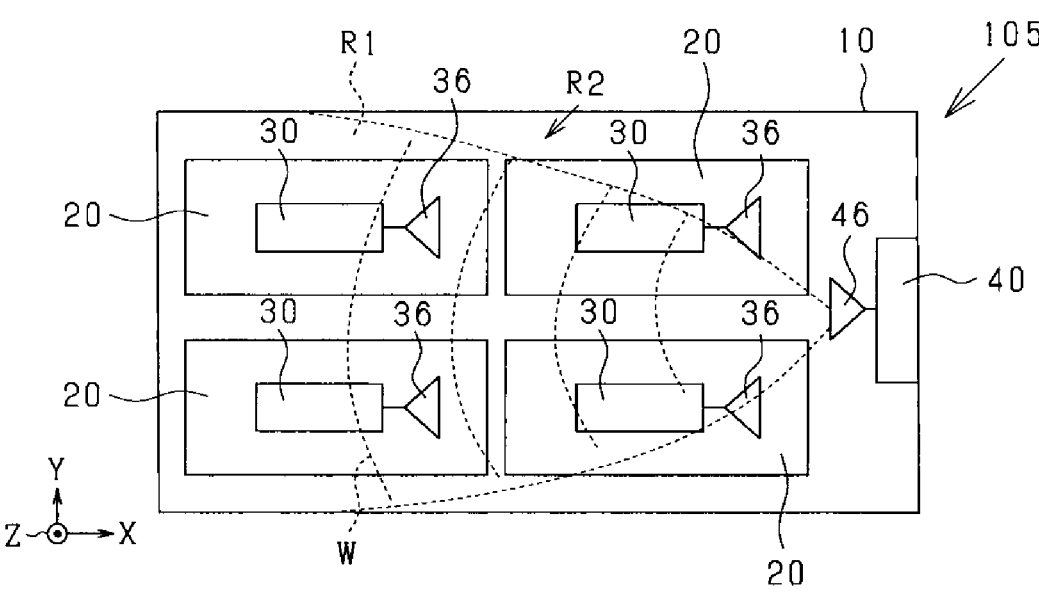
FIG. 11 is a plan sectional view which illustrates a battery pack in the fifth embodiment.
Figure 12:
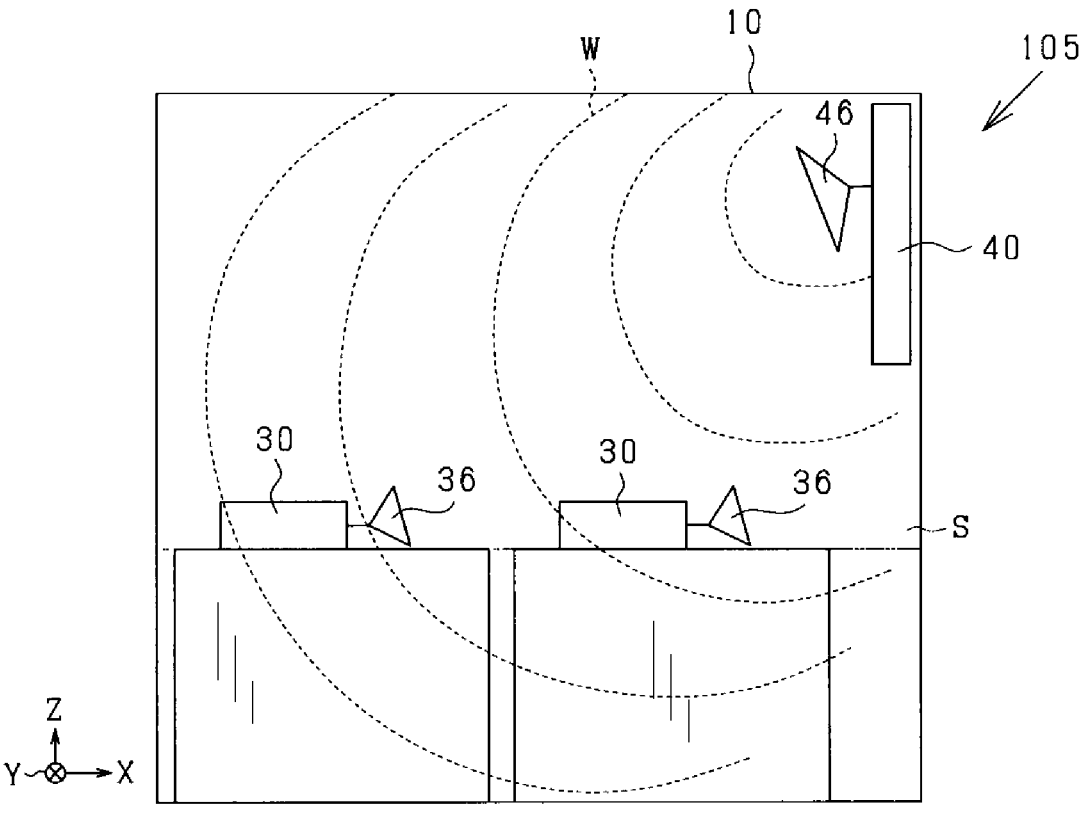
FIG. 12 is a front sectional view which illustrates a battery pack in the fifth embodiment.

FIG. 11 is a plan sectional view which illustrates the battery pack 105 in the fifth embodiment. FIG. 12 is a front sectional view of the battery pack 105. Each of the antennas 46 and 36 is engineered to have the undirectional direction oriented in the thickness-wise direction (i.e., the direction Y) of the battery pack 105 in which the radio wave W is not intended to be emitted. Specifically, each of the antennas 46 and 36 is oriented to have a directivity over a range between the front-back perpendicular directions X and Z in which the radio wave W is intended to be emitted. The master antenna 46, therefore, as illustrated in FIG. 12, two-dimensionally emits the radio wave W over a range between the front-back perpendicular directions X and Z. The master antenna 46, as can be seen FIG. 11, does not emit the radio wave W in the undirectional direction Y. Similarly, each of the slave antennas 36 two-dimensionally emits the radio wave W, not shown, over a range between the front-back perpendicular directions X and Z, but not output the radio wave W in the direction Y.

The battery pack 105 in this embodiment, therefore, works to greatly reduce the diffuse reflection of the radio wave W in the communication region S which is narrow in the direction Y, not the vertical direction Z.

Sixth Embodiment

The sixth embodiment will be described below in terms of parts different from those in the first embodiment.

Figures 13, 14:
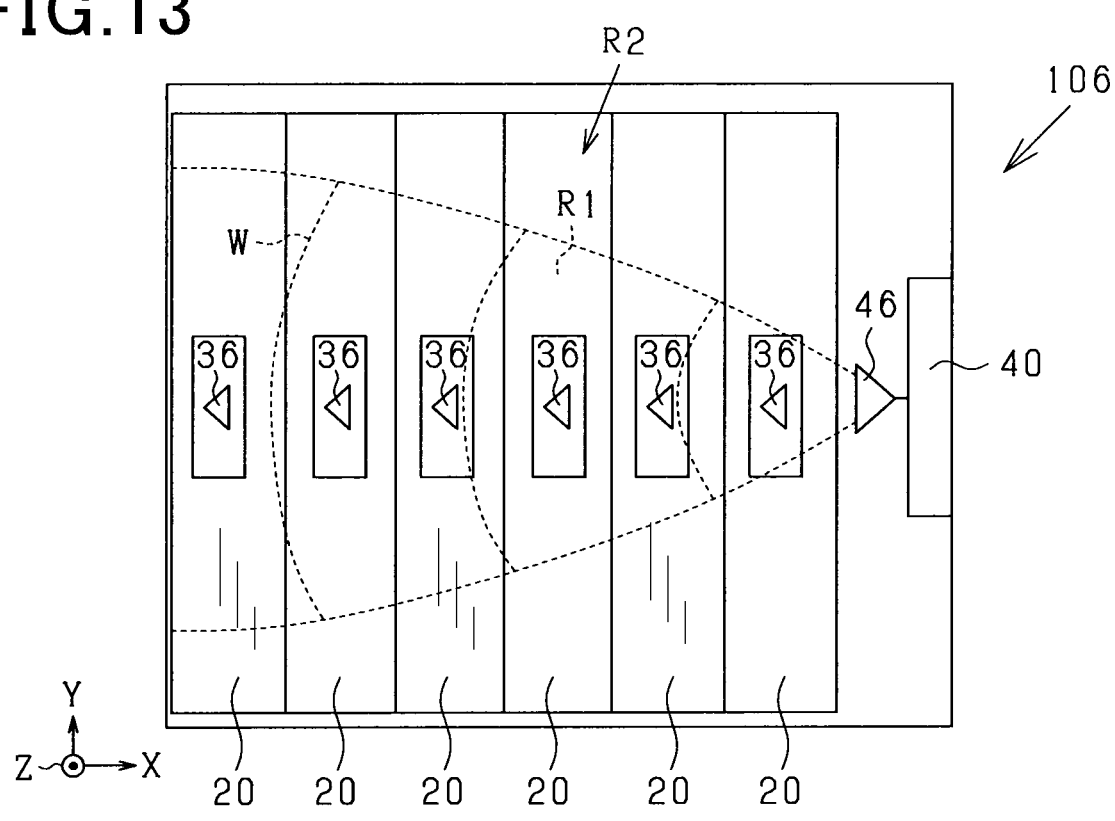
FIG. 13 is a plan sectional view which illustrates a battery pack according to the sixth embodiment.
FIG. 14 is a front sectional view which illustrates a battery pack in the sixth embodiment.

FIG. 13 is a plan sectional view which illustrates the battery pack 106 in the sixth embodiment. FIG. 14 is a front sectional view of the battery pack 106. The sixth embodiment is different from the first embodiment in that each of the antennas 46 and 36 has a directivity toward a narrow range in the longitudinal direction Y as well as in the vertical direction Z.

Specifically, the master antenna 46 is designed to have the undirectional direction oriented both in the vertical direction Z (i.e., a thickness-wise direction) and in the direction Y (i.e., a width-wise direction in this embodiment) in which the radio wave W is not intended to be radiated. More specifically, the master antenna 46, as clearly illustrated in FIGS. 13 and 14, emits the radio wave W at a given spread angle in the leftward direction, but does not radiate the radio wave W in the undirectional directions: the width-wise direction Y, the vertical direction Z, and the rightward direction. Unlike the master antenna 46, each of the slave antennas 36 emits the radio wave W at a given spread angle in the rightward direction, but does not radiate the radio wave W in the undirectional directions: the width-wise direction Y, the vertical direction Z, and the leftward direction.

In operation, the radio wave W, as produced by each of the antennas 36 and 46, is radiated more strongly in power in the direction X than in the direction Y as well as in the vertical direction Z (i.e., the thickness-wise direction of the communication region S) within the communication region S. This causes the radio wave W, as emitted by each of the antennas 36 and 46, not to reach ends of the communication region S both in the direction Z and in the direction Y, thereby greatly decrease a risk of diffuse reflection of the radio wave W within the communication region S.

Seventh Embodiment

The seventh embodiment will be described below in terms of parts different from those in the sixth embodiment.

Figure 15:
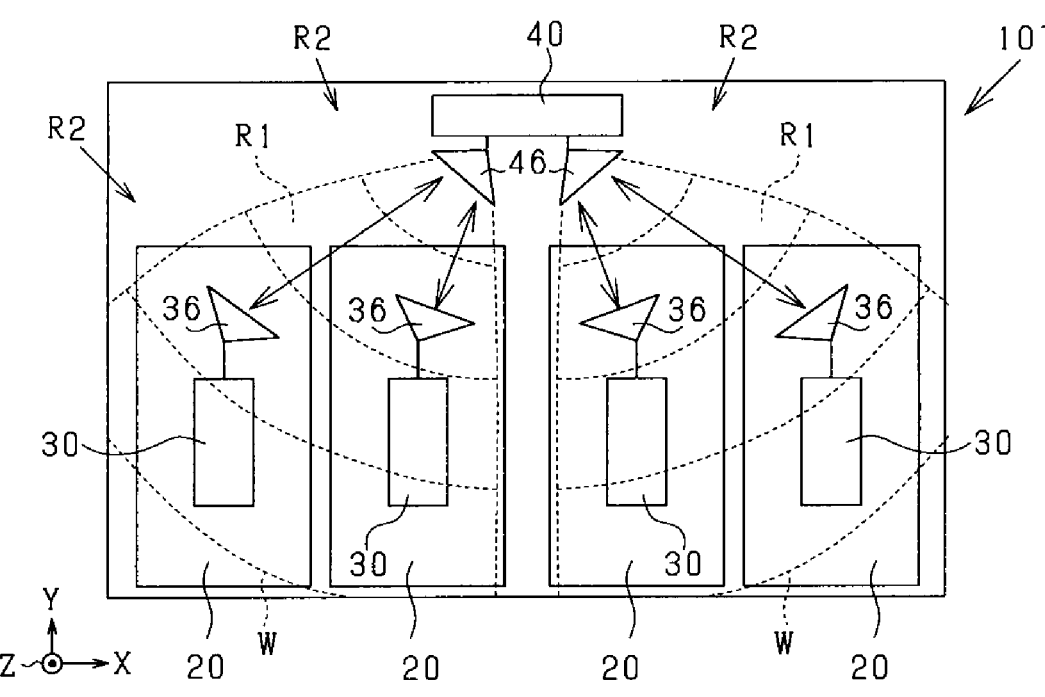
FIG. 15 is a plan sectional view which illustrates a battery pack according to the seventh embodiment.

FIG. 15 is a plan view which illustrates the battery pack 107 in the seventh embodiment which is different from the sixth embodiment in that the monitoring device 40 is located on a lateral central area on an inner back surface of the housing 10. The monitoring device 40 is located at substantially equal intervals away from the right and left walls of the housing 10 in the lateral direction X. The monitoring device 40 is equipped with two maters antennas: the right and left antennas 46. The slave antennas 36 of the assembled batteries 20 are broken down into two groups: a left group made up of a left two of the slave antennas 36, and a right group made up of a right two of the slave antennas 36. The left master antenna 46 outputs the radio wave W obliquely forward left to the left group of the slave antennas 36. The left group of the slave antennas 36 output radio waves to the left master antenna 46. Similarly, the right master antenna 46 emits the radio wave W obliquely forward right to the right group of the slave antennas 36. The right group of the slave antennas 36 output radio waves to the right master antenna 46. The right and left master antennas 46 have directivities in which the directional regions R1 where the direct waves produced by right and left master antennas 46 travel are at least out of overlap with each other.

The monitoring device 40 is, as described above, equipped with a plurality of directional master antennas, i.e., the right and left master antennas 46. This enables the directional region R1 of each of the master antennas 46 to be reduced in size or volume as compared with when the monitoring device 40 is equipped with a single master antenna, thereby enhancing the decrease in diffuse reflection.

The master antennas 46, as described above, have directivities at least in which the directional region R1 of each of the master antennas 46 does not overlap with that of another of the master antennas 46. This minimizes a risk of electromagnetic interference in the battery pack 107 as compared with when the directional regions R1 overlap each other.

The master antennas 46 are located at substantially equal intervals away from the right and left walls of the housing 10, as viewed in FIG. 15, thereby ensuring the stability of arrival of the radio wave W at the leftmost slave antenna 36 as compared with when the master antenna 46 is mounted, like in the sixth embodiment in FIGS. 13 and 14, on the right or left side wall of the housing 10. This enables the strength of the radio wave W to be lowered to decrease the diffuse reflection of the radio wave W near the slave antenna 36 located closest to each of the master antennas 46. The lowering of the strength of the radio wave W also results in a decrease consumption of electrical power in the battery pack 107.

Eighth Embodiment

The eighth embodiment will be described below in terms of parts different from those in the seventh embodiment.

Figure 16:
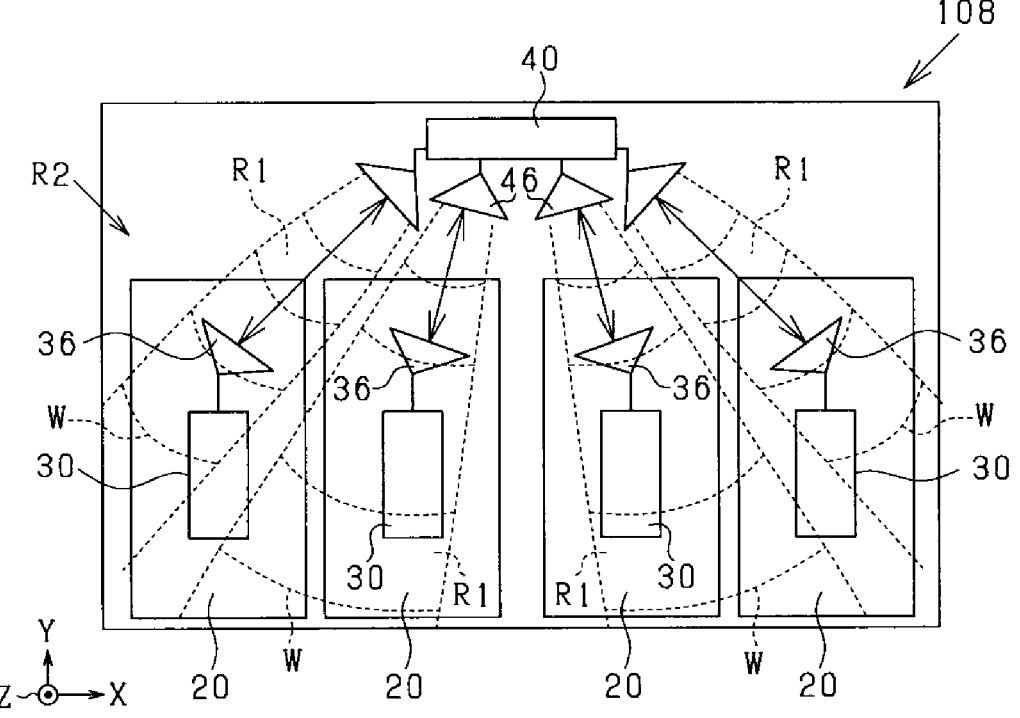
FIG. 16 is a plan sectional view which illustrates a battery pack according to the eighth embodiment.

FIG. 16 is a plan view which illustrates the battery pack 108 in the eighth embodiment which is different from the seventh embodiment in that the monitoring device 40 is equipped with the master antennas 46 one for each of the slave antennas 36.

Specifically, the monitoring device 40 is equipped with the master antennas 46 implemented by directional antennas, one for each of the slave antennas 36, thereby enabling the directional region R1 of each of the master antenna 46 to be decreased in size or volume thereof, which enhances the decrease in diffuse reflection in the battery pack 108.

The battery pack 108 also offers the following beneficial advantages. Usually, when it is required for the master antenna 46 to establish radio communications with the two or more slave antennas 36, identification items (IDs) are assigned to the slave antennas 36 to discriminate among the slave antennas 36. This leads to a risk that when the communications of the master antenna 46 with the two slave antennas 36 are lost, it may cause the IDs to be undesirably exchanged with each other. The battery pack 108 in this embodiment includes the master antennas 46, one for each of the slave antennas 36, thus eliminating the above problem, which ensures the stability in radio communications of the monitoring device 40 with the assembled batteries 20.

Ninth Embodiment

The ninth embodiment will be described below in terms of parts different from those in the eighth embodiment.

FIG. 17 is a plan view which illustrates the battery pack 109 in the ninth embodiment which is different from the eighth embodiment in that the monitoring device 40 is equipped with the selector 45 which selects one of the master antennas 46 which is required to emit the radio wave W. Specifically, the selector 45 switches between the master antennas 46 in time sequence to output the radio waves W in a time interval difference mode to the slave antennas 36. The directional regions R1 of the master antennas 46 may partially overlap each other.

The battery pack 108 in this embodiment is, as described above, designed to successively output the radio waves W from the master antennas 46 to the slave antennas 36 in the time shift mode, thereby decreasing a risk of a communication failure arising from the radio wave interference as compared with when the master antennas 46 emit the radio wave W simultaneously with the slave antennas 36. Particularly, the time shift outputs of the radio waves W from the master antennas 46 minimizes the risk of the communication failure even when the directional regions R1 partially overlap each other.

Tenth Embodiment

The tenth embodiment will be described below in terms of parts different from those in the ninth embodiment.

FIG. 18 is a plan view which illustrates the battery pack 110 in the tenth embodiment which is different from the ninth embodiment in that the monitoring device 40 is equipped with the master antennas 46 each of which achieve radio communications with two or more of the slave antennas 36. Other arrangements are identical with those in the ninth embodiment.

The structure of the battery pack 110 enables the number of the master antennas 46 to be decreased as compared with the ninth embodiment.

Other Modifications

The above described embodiments may be modified in the following ways. For example, the master antenna(s) 46 and the slave antennas 36 are implemented by directional antennas in the above embodiments, but only the master antenna 46 or only one(s) or all of the slave antennas 36 may alternatively be made of directional antennas. This also decreases the risk of diffuse reflection as compared with when all the antennas 46 and 36 are made of typical non-directional antennas.

The communication region S is, as described above, three-dimensionally surrounded by the upper surfaces of the assembled batteries 20 and the inner surface of the housing 10 in the above embodiments, but may alternatively be three-dimensionally surrounded by a surface of an electrical conductor and the inner surface of the housing 10 instead of the upper surfaces of the assembled batteries 20. The housing 10 may alternatively be made of a non-conductive material, such as resin in the above embodiments. The communication region S may be three-dimensionally surrounded by an electrical conductor(s) disposed inside the housing 10.

In the first embodiment, each of the antennas 46 and 36, as can be seen in FIG. 3, has a directivity which creates the directional region R1 of the direct wave which is kept only away from the upper end of the communication region S, but reaches the lower end of the communication region S, but may alternatively be engineered to have a directivity which defines the directional region R1 kept only away from the lower end of the communication region S, but reaching the upper end of the communication region S. Each of the antennas 46 and 36 may also be designed to have a directivity creating the directional region R1 of the direct wave which is kept away both from the upper end and from the lower end of the communication region S. This enhances the decrease in diffuse reflection in the battery pack. Conversely, each of the antennas 46 and 36 may have a directivity creating the directional region R1 of the direct wave which reaches both the upper and lower ends of the communication region S. This also decreases the diffuse reflection as compared with when the antennas 46 and 36 are implemented by typical non-directional antennas.

Each of the antennas 46 and 36 in the first embodiment, as described above, has a directivity creating the directional region R1 of the direct wave which is located away from the upper end of the communication region S, but may alternatively be engineered to have a directivity creating a directional region of waves resulting from reflection of the radio wave W and the direct wave which does not reach the upper end of the communication region S. This enhances the decrease in diffuse reflection in the battery pack. The seventh embodiment in FIG. 15 and the tenth embodiment in FIG. 18 is equipped with the two master antennas 46, but may alternatively have three or more master antennas 46. Each drawing illustrates the four assembled batteries 20, the four obtaining units 30, and the four slave antennas 36, but the number of them may be optionally changed.

What is claimed is:

1. A battery pack comprising:

a housing;

a plurality of assembled batteries disposed in the housing;

obtaining units each of which obtains battery information about a corresponding one of the assembled batteries, the obtaining units being equipped with slave antennas; and a monitoring device equipped with a master antenna that achieves a wireless communication with the slave antenna of each of the obtaining units to receive the battery information within the housing, the monitoring device being located at a place within an interior of the housing that faces a side surface of at least one of the plurality of assembled batteries, wherein:

the master antenna and/or the slave antennas are each implemented by a directional antenna which radiates a radio wave more strongly in power in a directional direction than in an undirectional direction;

radio waves which are outputted from the master and the slave antennas and undergo no reflection are defined as direct waves;

a first antenna, which is one of the slave antennas or the master antenna, is located at a place which is out of reach of the direct wave emitted from a second antenna, which is one of the slave antennas or the master antenna other than the first antenna;

the first antenna is implemented by a directional antenna; and the battery pack further comprises a reflector which is disposed in the housing, the first antenna emitting the radio wave to the reflector, and the reflector reflecting the radio wave from the first antenna toward the second antenna.

2. The battery pack as set forth in claim 1, wherein:

each of the assembled batteries has a first surface and a second surface, which is the side surface;

the obtaining units are disposed on the first surfaces of the assembled batteries; and the monitoring device is arranged on at least one of the second surfaces of the assembled batteries.

3. The battery pack as set forth in claim 1, wherein:

each of the assembled batteries has a first surface and a second surface, which is the side surface;

the obtaining units are disposed on the first surfaces of the assembled batteries;

the monitoring device is arranged on at least one of the second surfaces of the assembled batteries; and the first surfaces extend substantially perpendicular to the second surfaces.

4. The battery pack as set forth in claim 1, wherein the monitoring device has a lower surface, which is located below upper surfaces of the assembled batteries.

5. The battery pack as set forth in claim 1, wherein the monitoring device is located so as to face the side surfaces of the assembled batteries.

6. The battery pack as set forth in claim 1, wherein the monitoring device has an upper surface that is located below upper surfaces of the assembled batteries.

7. A battery pack comprising:

a housing;

a plurality of assembled batteries disposed in the housing;

obtaining units each of which obtains battery information about a corresponding one of the assembled batteries, the obtaining units being equipped with slave antennas; and a monitoring device equipped with a master antenna that achieves a wireless communication with the slave antenna of each of the obtaining units to receive the battery information within the housing, the monitoring device being located at a place within an interior of the housing that faces a side surface of at least one of the plurality of assembled batteries, wherein:

radio waves which are outputted from the master and the slave antennas and undergo no reflection are defined as direct waves;

a first antenna, which is one of the slave antennas or the master antenna, is located at a place which is out of reach of the direct wave emitted from a second antenna, which is one of the slave antennas or the master antenna other than the first antenna; and the battery pack further comprises a reflector which is disposed in the housing, the first antenna emitting the radio wave to the reflector more strongly in power than to a non-reflective region in the housing, and the reflector reflecting the radio wave from the first antenna toward the second antenna.

8. The battery pack as set forth in claim 1, wherein the housing is made of an electrically conductive material, and a portion of a surface of the housing constitutes the reflector.

9. The battery pack as set forth in claim 1, wherein:

each of the assembled batteries has a first surface and a second surface different from the first surface, the second surface being the side surface;

the first surfaces of the assembled batteries face the obtaining units; and the second surfaces of the assembled batteries face the monitoring device.

10. The battery pack as set forth in claim 1, wherein the plurality of assembled batteries are made of the same type of cells.

11. The battery pack as set forth in claim 7, wherein:

each of the assembled batteries has a first surface and a second surface, which is the side surface;

the obtaining units are disposed on the first surfaces of the assembled batteries; and the monitoring device is arranged on at least one of the second surfaces of the assembled batteries.

12. The battery pack as set forth in claim 7, wherein:

each of the assembled batteries has a first surface and a second surface, which is the side surface;

the obtaining units are disposed on the first surfaces of the assembled batteries;

the monitoring device is arranged on at least one of the second surfaces of the assembled batteries; and the first surfaces extend substantially perpendicular to the second surfaces.

13. The battery pack as set forth in claim 7, wherein the monitoring device has a lower surface, which is located below upper surfaces of the assembled batteries.

14. The battery pack as set forth in claim 7, wherein the monitoring device is located so as to face the side surfaces of the assembled batteries.

15. The battery pack as set forth in claim 7, wherein the monitoring device has an upper surface that is located below upper surfaces of the assembled batteries.

16. The battery pack as set forth in claim 7, wherein
the housing is made of an electrically conductive material,
   and
a portion of a surface of the housing constitutes the
   reflector.

17. The battery pack as set forth in claim 7, wherein:
each of the assembled batteries has a first surface and a
   second surface different from the first surface, the
   second surface being the side surface;
the first surfaces of the assembled batteries face the
   obtaining units; and
the second surfaces of the assembled batteries face the
   monitoring device.

18. The battery pack as set forth in claim 7, wherein the
plurality of assembled batteries are made of the same type of
cells.

* * * * *